(12) United States Patent
Chen et al.

(10) Patent No.: US 11,351,532 B2
(45) Date of Patent: Jun. 7, 2022

(54) PHOTOCATALYTIC COMPOSITE MATERIAL AND PREPARATION METHOD AND APPLICATION THEREOF

(71) Applicant: SUZHOU UNIVERSITY OF SCIENCE AND TECHNOLOGY, Jiangsu (CN)

(72) Inventors: Zhigang Chen, Jiangsu (CN); Feng Chen, Jiangsu (CN); Junchao Qian, Jiangsu (CN); Chengbao Liu, Jiangsu (CN); Chencheng Wang, Jiangsu (CN)

(73) Assignee: Suzhou University Of Science And Technology, Jiangsu (CN)

( * ) Notice: Subject to any disclaimer, the term of this patent is extended or adjusted under 35 U.S.C. 154(b) by 0 days.

(21) Appl. No.: 16/610,028

(22) PCT Filed: Jul. 30, 2018

(86) PCT No.: PCT/CN2018/097718
§ 371 (c)(1),
(2) Date: Oct. 31, 2019

(87) PCT Pub. No.: WO2020/024090
PCT Pub. Date: Feb. 6, 2020

(65) Prior Publication Data
US 2021/0276000 A1    Sep. 9, 2021

(51) Int. Cl.
*B01J 37/02*    (2006.01)
*C25B 11/049*    (2021.01)
(Continued)

(52) U.S. Cl.
CPC .......... *B01J 37/0213* (2013.01); *B01J 6/001* (2013.01); *B01J 21/18* (2013.01); *B01J 27/051* (2013.01);
(Continued)

(58) Field of Classification Search
CPC ........ B01J 37/0213; B01J 6/001; B01J 21/18; B01J 27/051; B01J 35/004; B01J 35/0046; C25B 1/55; C25B 11/049; C25B 1/04
(Continued)

(56) References Cited

U.S. PATENT DOCUMENTS 2,037,257 A * 4/1936 Morrell ................. C01B 32/336
502/432
4,243,553 A * 1/1981 Naumann .............. B01J 27/051
423/53
(Continued)

FOREIGN PATENT DOCUMENTS

CN        102583368    *  7/2012    .......... C01B 32/318
CN        103922382 A     7/2014
(Continued)

OTHER PUBLICATIONS

Feng Chen et al., "MoS2 decorated lignin-derived hierarchical mesoporous carbon hybrid nanospheres with exceptional Li-Ion battery cycle stability." Chinese Chemical Letters 30, pp. 197-202. (Year: 2019).*

(Continued)

*Primary Examiner* — Patricia L. Hailey
(74) *Attorney, Agent, or Firm* — Harness, Dickey & Pierce, P.L.C.

(57) ABSTRACT

The present invention provides a preparation method of a photocatalytic composite material, and relates to the field of catalyst technologies. The preparation method provided in the present invention includes the following steps: (1) subjecting plant leaves to soaking pretreatment to obtain template biomass; (2) mixing a molybdenum source-sulfur source aqueous solution with the template biomass obtained in step (1) and conducting impregnation to obtain a composite material precursor; and (3) calcining the composite (Continued)

material precursor obtained in step (2) to obtain the photocatalytic composite material. The photocatalytic composite material in the present invention includes acicular molybdenum sulfide and biomass carbon, the acicular molybdenum sulfide is loaded to a surface of the flake carbon, the mass content of the biomass carbon is 70% to 90%, and the mass content of the molybdenum sulfide is 10% to 30%. Performance of photocatalytic hydrogen production of the photocatalytic composite material in the present invention is better than that of a pure molybdenum sulfide material and has excellent photocorrosion resistance, and hydrogen production efficiency is reduced by only approximately 10% after three cycles.

18 Claims, 2 Drawing Sheets

(51) Int. Cl.
| | | |
|---|---|---|
| C25B 1/55 | (2021.01) | |
| B01J 6/00 | (2006.01) | |
| B01J 21/18 | (2006.01) | |
| B01J 27/051 | (2006.01) | |
| B01J 35/00 | (2006.01) | |
| C01B 3/04 | (2006.01) | |
| C25B 1/04 | (2021.01) | |

(52) U.S. Cl.
CPC ......... *B01J 35/004* (2013.01); *B01J 35/0046* (2013.01); *C01B 3/042* (2013.01); *C25B 1/55* (2021.01); *C25B 11/049* (2021.01); *C25B 1/04* (2013.01)

(58) Field of Classification Search
USPC ....... 502/180, 220, 416, 7; 423/445 R, 447.9
See application file for complete search history.

(56) References Cited

U.S. PATENT DOCUMENTS

| 8,080,227 | B1* | 12/2011 | Goodell | C21C 7/0025 |
| | | | | 423/447.9 |
| 2013/0276361 | A1* | 10/2013 | Maschmeyer | C10G 1/083 |
| | | | | 44/307 |
| 2020/0381732 | A1* | 12/2020 | Wagner | H01M 4/587 |
| 2020/0383331 | A1* | 12/2020 | Heinricher | A01N 37/52 |

FOREIGN PATENT DOCUMENTS

| CN | 105439203 | * | 3/2016 | ............ B01J 27/051 |
| CN | 105642364 | A | 6/2016 | |
| CN | 106563436 | * | 4/2017 | ............. B01J 21/18 |
| CN | 106563436 | A | 4/2017 | |
| CN | 106964371 | * | 7/2017 | ............ B01J 27/051 |
| CN | 106964371 | A | 7/2017 | |
| CN | 107298442 | * | 10/2017 | ............ B01J 27/051 |
| CN | 107511144 | * | 12/2017 | ............. B01J 20/06 |
| CN | 108855195 | * | 11/2018 | ............. B01J 27/24 |
| CN | 108970626 | A | 12/2018 | |
| CN | 109364951 | * | 2/2019 | ............ B01J 27/047 |
| CN | 110182801 | * | 8/2019 | ............ B01D 53/02 |

OTHER PUBLICATIONS

Jian Jiang et al., "Evolution of disposable bamboo chopsticks into uniform carbon fibers: a smart strategy to fabricate sustainable anodes for Li-Ion batteries." Energy and Environmental Science, 7, pp. 2670-2679. (Year: 2014).*

Xian-Ming Liu et al., "Carbon nanotube (CNT)-based composites as electrode material for rechargeable Li-ion batteries: A review." Composites Science and Technology 72, pp. 121-144. (Year: 2012).*

Shanlin Qiao et al., "Micrometer-Scale Biomass carbon tube matrix auxiliary MoS2 heterojunction for electrocatalytic hydrogen evolution." International Journal of Hydrogen Energy 44, pp. 32019-32029. (Year: 2019).*

Jeong-Cheol Seo et al., "Microalgae-derived hollow carbon-MoS2 composite as anode for lithium-ion batteries." Journal of Industrial and Engineering Chemistry 79, pp. 106-114. (Year: 2019).*

Keliang Wang et al., "Nitrogen-modified biomass-derived cheese-like porous carbon for electric double layer capacitors." RSC Advances, 6, pp. 26738-26744. (Year: 2016).*

Dong Xie et al., "Novel carbon channels from loofah sponge for construction of metal sulfide/carbon composites with robust electrochemical energy storage." Journal of Materials Chemistry A, 5, pp. 7578-7585. (Year: 2017).*

Uttam Gupta et al., "Hydrogen generation by water splitting using MoS2 and other transition metal dichalcogenides." Nano Energy 41, pp. 49-65. (Year: 2017).*

Yan Guo et al., "Vertically aligned ultrathin MoS2 nanosheets grown on graphene-wrapped hollow carbon microtubes derived from loofah sponge as advanced anodes for highly reversible lithium storage." Electrochimica Acta 296, pp. 989-998. (Year: 2019).*

Translation of Written Opinion for PCT/CN2018/097718 dated Apr. 12, 2019. (Year: 2019).*

International Search Report (in Chinese) issued in PCT/CN2018/097718, dated Apr. 12, 2019; ISA/CN.

* cited by examiner

PHOTOCATALYTIC COMPOSITE MATERIAL AND PREPARATION METHOD AND APPLICATION THEREOF

CROSS REFERENCE TO RELATED APPLICATION

The present application is a U.S. National Phase Application under 35 U.S.C. 371 of International Application No. PCT/CN2018/097718 filed on Jul. 30, 2018. The disclosure of the above application is incorporated herein by reference in its entirety.

TECHNICAL FIELD

The present invention relates to the field of catalyst technologies, and in particular, to a photocatalytic composite material and a preparation method and an application thereof.

BACKGROUND

A water electrolysis method for hydrogen production is a most common hydrogen production method, but it has many disadvantages. 1. A solid polymer electrolyte membrane is a core part of water electrolysis for hydrogen production. However, currently, the development of solid polymer electrolyte membranes in China is greatly limited and depends on a few foreign companies, and consequently hydrogen production costs are relatively high. 2. The thin film as a catalyst has limited service life and a low reuse rate. 3. In an actual operation process, a large amount of electric energy needs to be consumed.

In the field of water photolysis for hydrogen production, commonly used catalysts are pure semiconductor oxides, such as cerium dioxide and titanium dioxide. Band gaps of the semiconductor oxides are approximately 3.2 eV, and can be used for photocatalytic reaction only in an ultraviolet region of sunlight. In addition, an ultraviolet part accounts for only approximately 4% of a solar spectrum, and sunlight utilization is relatively low. A transition metal sulfide semiconductor material can respond directly to visible light, but the transition metal sulfide semiconductor material has an obvious photocorrosion effect, and a capability of separating a photogenerated electron hole pair needs to be improved. This limits an application of the transition metal sulfide semiconductor material in the photocatalysis field.

SUMMARY

In view of this, an objective of the present invention is to provide a photocatalytic composite material and a preparation method and an application thereof. The photocatalytic composite material provided in the present invention can improve a capability of separating a photogenerated electron hole pair, and avoid a photocorrosion effect existing in a transition metal sulfide semiconductor material, thereby greatly improving visible light utilization of the material, and showing a wide potential application value in water decomposition for hydrogen production under an action of visible light.

To achieve the above purpose, the present invention provides the following technical solutions.

The present invention provides a preparation method of a photocatalytic composite material, including the following steps:

(1) subjecting plant leaves to soaking pretreatment to obtain template biomass;
(2) impregnating, in a molybdenum source-sulfur source aqueous solution, the template biomass obtained in step (1) to obtain a composite material precursor; and
(3) calcining the composite material precursor prepared in step (2) to obtain the photocatalytic composite material.

Preferably, the plant leaves include *Sinaraundinaria nitida* leaves, salix leaves, *Indocalamus* leaves, *Phyllostachys sulphurea* leaves, or *Phyllostachys nigra* leaves.

Preferably, a concentration of a sulfur source in the molybdenum source-sulfur source aqueous solution is 0.05 mol/L to 1 mol/L.

Preferably, a concentration of a molybdenum source in the molybdenum source-sulfur source aqueous solution is 0.05 mol/L to 1 mol/L.

Preferably, a ratio of a volume of the molybdenum source-sulfur source aqueous solution to a mass of the template biomass is (1-3) L: 100 g.

Preferably, an impregnation time is 48 h to 72 h.
Preferably, calcination temperature is 450° C. to 700° C.
Preferably, the calcination time is 120 min to 158 min.

The present invention further provides a photocatalytic composite material obtained by using the above-described preparation method, where the photocatalytic composite material in the present invention includes acicular molybdenum sulfide and biomass carbon, the acicular molybdenum sulfide is loaded to a surface of the flake carbon, the mass content of the biomass carbon is 70% to 90%, and the mass content of the molybdenum sulfide is 10% to 30%.

The present invention further provides an application of the above-described photocatalytic composite material in water decomposition for hydrogen production.

The present invention provides a preparation method of a photocatalytic composite material, including the following steps: (1) subjecting plant leaves to soaking pretreatment to obtain template biomass; (2) impregnating, in a molybdenum source-sulfur source aqueous solution, the template biomass obtained in step (1) to obtain a composite material precursor; and (3) calcining the composite material precursor obtained in step (2) to obtain the photocatalytic composite material. In the present invention, the template biomass loaded with sulfur ions and molybdenum ions is calcined, acicular molybdenum sulfide is formed by using a carbon skeleton of an organic matter and a special microscopic structure that are of the template biomass, and the molybdenum sulfide is formed and grows on a carbon surface, forming an acicular molybdenum sulfide and biomass carbon photocatalytic composite material. The photocatalytic composite material provided in the present invention has an acicular structure, and therefore can improve a capability of separating a photogenerated electron hole pair, and avoid a photocorrosion effect existing in a transition metal sulfide semiconductor material, thereby greatly improving visible light utilization of the material, and showing a wide potential application value in water decomposition for hydrogen production under an action of visible light. It can be learned from embodiments that performance of photocatalytic hydrogen production of the photocatalytic composite material is better than that of a pure molybdenum sulfide material and has excellent photocorrosion resistance, and hydrogen production efficiency is reduced by only approximately 10% after three cycles.

DETAILED DESCRIPTION

Figure 1:
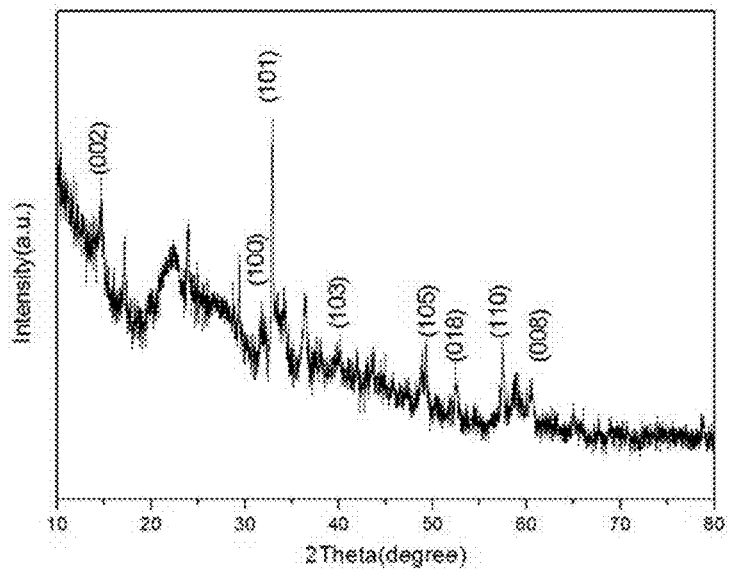
FIG. 1 is an XRD spectrum of a photocatalytic composite material prepared in Embodiment 1.

The present invention is further described below with reference to embodiments.

The present invention provides a preparation method of a photocatalytic composite material, including the following steps:

(1) subjecting plant leaves to soaking pretreatment to obtain template biomass;

(2) impregnating, in a molybdenum source-sulfur source aqueous solution, the template biomass prepared in step (1) to obtain a composite material precursor; and (3) calcining the composite material precursor obtained in step (2) to obtain the photocatalytic composite material.

In the present invention, the plant leaves are subjected to soaking pretreatment obtain the template biomass. A type of the plant leaves is not particularly limited in the present invention, and may be any plant leave that is well known to a person skilled in the art. Specifically, the plant leaves are Sinaraundinaria *nitida* leaves, salix leaves, *Indocalamus* leaves, *Phyllostachys sulphurea* leaves, or *Phyllostachys nigra* leaves.

In the present invention, the soaking pretreatment preferably includes the following steps: (a) mixing the plant leaves with a first reagent and conducting impregnation, to obtain preliminarily pretreated plant leaves; and (b) mixing the preliminarily pretreated plant leaves obtained in step (a) with a second reagent and conducting impregnation, to obtain the template biomass.

In the present invention, the first reagent is preferably prepared by mixing diluted hydrochloric acid with a mass concentration of 5% to 15% and anhydrous ethanol at a volume ratio of (15-30):500. A ratio of a volume of the first reagent to a mass of the plant leaves is not particularly limited in the present invention, as long as the first reagent can immerse the plant leaves. In the present invention, an impregnation time is preferably 72 h. In the present invention, after impregnation is completed, the impregnated plant leaves are preferably washed with water three to four times and air-dried to obtain the preliminarily pretreated plant leaves. In the present invention, the solution after impregnation preferably shows a green color. In the present invention, the anhydrous ethanol in the first reagent can destroy cell membranes of the plant leaves through permeation, and further dissolve an organelle, a pigment, and the like in a cell; and a function of hydrochloric acid is to make hydroxide groups and carboxy groups formed on a plant surface, so that ions in the molybdenum source-sulfur source aqueous solution are more easily bonded to the plant leaves subsequently.

In the present invention, after the preliminarily pretreated plant leaves are obtained, the preliminarily pretreated plant leaves are preferably mixed with the second reagent and impregnated, to obtain the template biomass. In the present invention, the second reagent is preferably prepared by mixing 5% diluted hydrochloric acid, anhydrous ethanol, and water at a volume ratio of (1-3):1:1. A ratio of a mass of the preliminarily pretreated plant leaves to a volume of the second reagent is not particularly limited in the present invention, as long as the second reagent can immerse the plant leaves. In the present invention, an impregnation time is preferably 24 h. In the present invention, after impregnation is completed, the impregnated preliminarily pretreated plant leaves are preferably cleaned with water and air-dried to obtain the template biomass. In the present invention, the solution after impregnation preferably shows a faint yellow color.

In the present invention, the soaking pretreatment can destroy cellular structures of the plant leaves, so that more molybdenum sources and sulfur sources are loaded to the template biomass subsequently, thereby improving performance of the photocatalytic composite material.

In the present invention, after the template biomass is obtained, the template biomass is impregnated in the molybdenum source-sulfur source aqueous solution to obtain the composite material precursor. In the present invention, a molar weight ratio of a molybdenum source to a sulfur source in the molybdenum source-sulfur source aqueous solution is preferably 1:2. In the present invention, a concentration of the molybdenum source in the molybdenum source-sulfur source aqueous solution is preferably 0.05 mol/L to 1 mol/L, more preferably 0.1 mol/L to 0.8 mol/L, and most preferably 0.3 mol/L to 0.6 mol/L. In the present invention, the molybdenum source preferably includes sodium molybdate or ammonium molybdate. In the present invention, a concentration of the sulfur source in the molybdenum source-sulfur source aqueous solution is preferably 0.05 mol/L to 1 mol/L, more preferably 0.1 mol/L to 0.8 mol/L, and most preferably 0.3 mol/L to 0.6 mol/L. In the present invention, the sulfur source preferably includes thiourea or sodium sulfide.

In the present invention, a ratio of a volume of the molybdenum source-sulfur source aqueous solution to a mass of the template biomass is (1-3) L:100 g, more preferably (1.5-2.5) L:100 g, and most preferably (1.8-2.2) L:100 g. In the present invention, impregnation temperature is preferably 20° C. to 30° C., more preferably 22° C. to 28° C., and most preferably 24° C. to 26° C. In the present invention, an impregnated time is preferably 48 h to 72 h, more preferably 54 h to 66 h, and most preferably 57 h to 63 h. In the present invention, after impregnation is completed, an impregnated product is preferably cleaned and dried, to obtain the composite material precursor.

In the present invention, molybdenum ions and sulfur ions in the molybdenum source-sulfur source aqueous solution can be adequately loaded on the template biomass through impregnation.

In the present invention, after the composite material precursor is obtained, the composite material precursor is calcined to obtain the photocatalytic composite material. In the present invention, calcination temperature is preferably 450° C. to 700° C., more preferably 500° C. to 650° C., and most preferably 550° C. to 600° C. In the present invention, a calcination time is preferably 120 min to 158 min, more preferably 125 min to 150 min, and most preferably 130 min to 140 min. In the present invention, a heating rate for heating to the calcination temperature is preferably 1° C./min to 10° C./min, more preferably 2° C./min to 5° C./min, and most preferably 3° C./min to 4° C./min. In the present invention, calcination is preferably conducted in an inert gas atmosphere. In the present invention, after calcination is completed, a calcined product is naturally cooled to room temperature to obtain the photocatalytic composite material.

In the present invention, through control on calcination temperature, a most part of a carbon skeleton of organic compounds in the template biomass is preserved, and guides formation and growth of an acicular molybdenum sulfide semi-conductor, so as to synthesize the acicular molybdenum sulfide/biomass carbon photocatalytic composite material that can catalyze hydrolysis for hydrogen production under an action of visible light.

The present invention further provides the photocatalytic composite material obtained by using the preparation method in the foregoing technical solution. In the present invention, the photocatalytic composite material includes acicular molybdenum sulfide and biomass carbon, and the acicular molybdenum sulfide is loaded to a surface of the flake carbon. In the present invention, in the photocatalytic composite material, the mass content of the molybdenum sulfide is preferably 10% to 30%, and the mass content of the biomass carbon is preferably 70% to 90%.

The present invention further provides an application of the photocatalytic composite material in the foregoing technical solution in water decomposition for hydrogen production. In the present invention, the application preferably includes the following step: mixing the photocatalytic composite material with water to form a solution with a concentration of 1 g/L, and producing hydrogen gas under irradiation of visible light.

The photocatalytic composite material provided in the present invention has an acicular structure, and therefore can improve a capability of separating a photogenerated electron hole pair, and avoid a photocorrosion effect existing in a transition metal sulfide semiconductor material, thereby greatly improving visible light utilization of the material, and showing a wide potential application value in water decomposition for hydrogen production under an action of visible light.

With reference to embodiments, the following describes in details the photocatalytic composite material and the preparation method thereof that are provided in the present invention, but cannot be understood as a limitation to the protection scope of the present invention.

Embodiment 1

A preparation method of a photocatalytic composite material includes the following steps:

(1) subjecting *Phyllostachys sulphurea* leaves to soaking pretreatment to obtain template biomass;

(2) mixing 10 g of the template biomass with a 200 mL molybdenum source-sulfur source aqueous solution containing 0.05 mol/L of sodium molybdate and 0.10 mol/L of thiourea, conducting impregnation at 25° C. for 72 hours, taking out an impregnation product, and conducting cleaning and drying successively to obtain a composite material precursor; and (3) heating to 700° C. in an atmosphere of nitrogen gas at a heating rate of 3° C./min, calcining for 120 min, and naturally cooling to room temperature to obtain the photocatalytic composite material.

Soaking pretreatment of the *Phyllostachys sulphurea* leaves includes: (a) mixing the *Phyllostachys sulphurea* leaves with a first reagent (prepared by mixing diluted hydrochloric acid with a mass concentration of 5% and anhydrous ethanol at a volume ratio of 30:500), conducting impregnation for 72 hours, and taking out an impregnation product and cleaning the impregnation product for three times to obtain preliminarily pretreated *Phyllostachys sulphurea* leaves; and (b) conducting impregnation of the preliminarily pretreated *Phyllostachys sulphurea* leaves and a second reagent (prepared by mixing diluted hydrochloric acid with a mass concentration of 5%, anhydrous ethanol and water at a volume ratio of 3:1:1) for 24 hours, taking out an impregnation product, repeatedly washing the impregnation product with distilled water, and conducting drying in the air.

FIG. 1 is an XRD spectrum of the photocatalytic composite material prepared in Embodiment 1. It can be seen from FIG. 1 that, although there are a few miscellaneous peaks, characteristic peaks of molybdenum sulfide can be clearly observed in the spectrum, among which (002), (100), and (101) correspond to three strong characteristic peaks of the molybdenum sulfide. In addition, there is a bulge before 25°, it can be learned according to relevant literatures that this bulge is amorphous carbon, and the amorphous carbon is the biomass carbon in the photocatalytic composite material.

Figure 2:
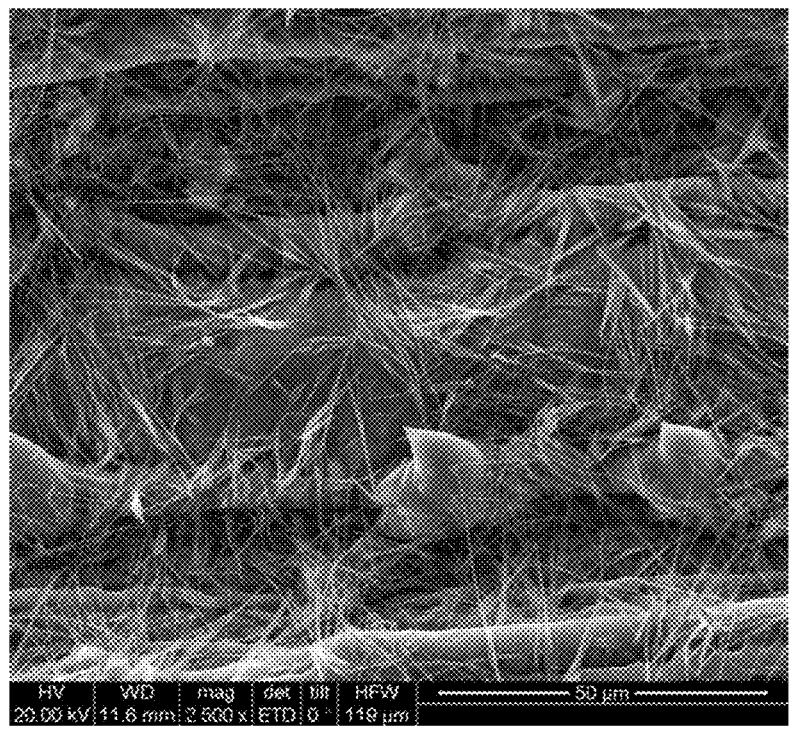
FIG. 2 is a field emission scanning electron microscope micrograph of the photocatalytic composite material prepared in Embodiment 1.

A structure of the photocatalytic composite material is observed by using a field emission scanning electron microscope, and a result is shown in FIG. 2. It can be learned from FIG. 2 that, a microstructure of the *Phyllostachys sulphurea* leaves is well preserved, and a special morphology also provides a guiding condition for formation and growth of acicular molybdenum sulfide; and finally, the structure of the photocatalytic composite material is that the acicular molybdenum sulfide is loaded on a surface of the flake biomass carbon.

Figure 3:
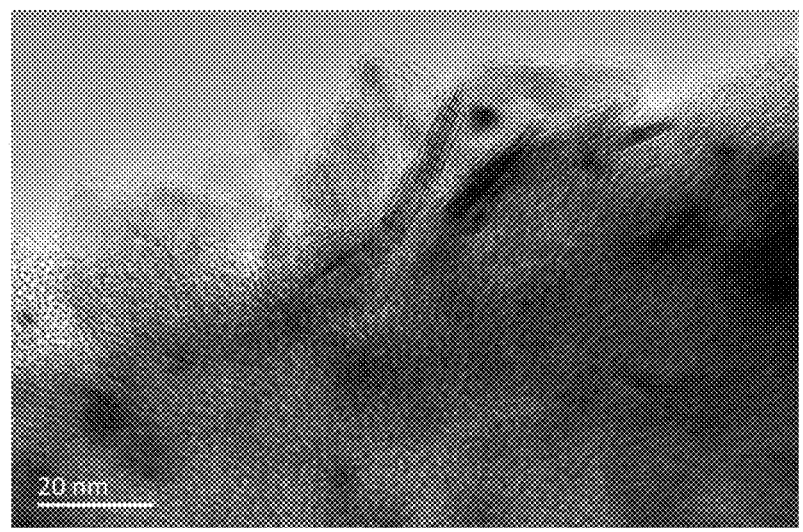
FIG. 3 is a transmission electron microscope micrograph of the photocatalytic composite material prepared in Embodiment 1.

FIG. 3 is a transmission electron microscope micrograph of the photocatalytic composite material in this embodiment, and a result is shown in FIG. 3. It can be seen from FIG. 3 that, the photocatalytic composite material is formed by stacking the acicular molybdenum sulfide. By measuring and calculating an interplanar crystal spacing of the photocatalytic composite material, it can be learned that the interplanar crystal spacing is 0.61 nm and corresponds to a (002) crystal face of the molybdenum sulfide. In a field of view, a flake material with no crystal lattice line is an amorphous carbon material, namely, the biomass carbon.

Figure 4:
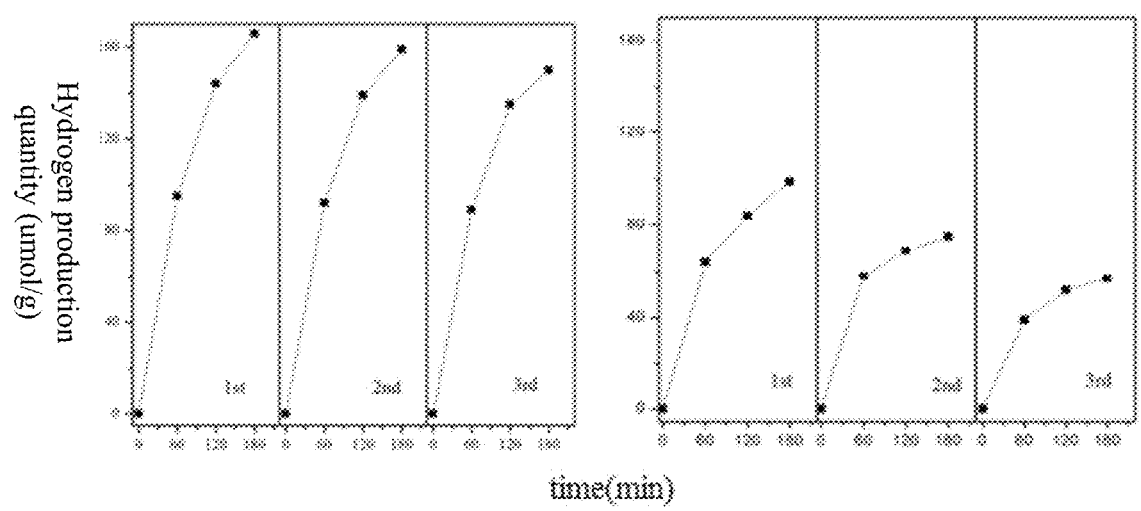
FIG. 4 is effect diagrams, obtained by respectively using the photocatalytic composite material prepared in Embodiment 1 and a pure molybdenum sulfide material, of photocatalytic decomposition of water for hydrogen production in a case of visible light excitation.

An application of the photocatalytic composite material prepared in this embodiment in water decomposition for hydrogen production includes the following step:

adding 0.1 g of the product to a reactor filled with 100 mL of ultrapure water, conducting sampling under simulated irradiation of visible light every one hour, and conducting diagraph analysis of data by using a chromatographic instrument to observe a change in a hydrogen production quantity of the product; and conducting comparison with a hydrogen production quantity obtained by using pure molybdenum sulfide as a catalyst used for water decomposition for hydrogen production. A result is shown in FIG. 4. It can be learned from FIG. 4 that the hydrogen production quantity of the photocatalytic composite material in this embodiment reaches 179 μmol/g after light irradiation for 3 hour, while the hydrogen production quantity obtained by using the pure molybdenum sulfide is 103 μmol/g. Therefore, performance of photocatalytic hydrogen production of the photocatalytic composite material is better than that of the pure molybdenum sulfide material and has excellent photocorrosion resistance, and hydrogen production efficiency is reduced by only approximately 10% after three cycles.

Embodiment 2

A preparation method of a photocatalytic composite material includes the following steps:

(1) subjecting salix leaves to soaking pretreatment to obtain template biomass.

(2) mixing 5 g of the template biomass with a 120 mL molybdenum source-sulfur source aqueous solution containing 0.10 mol/L of ammonium molybdate and 0.20 mol/L of sodium sulfide, conducting impregnation at 27° C. for 72 hours, taking out an impregnation product, and conducting cleaning and drying successively to obtain a composite material precursor; and (3) heating to 500° C. in an atmosphere of nitrogen gas at a heating rate of 3° C./min, calcining for 150 min, and naturally cooling to room temperature to obtain the photocatalytic composite material.

A soaking pretreatment method of the salix leaves is the same as a soaking pretreatment method of the *Phyllostachys sulphurea* leaves in Embodiment 1.

An application of the photocatalytic composite material prepared in this embodiment in water decomposition for hydrogen production includes the following step:

adding 0.1 g of the product to a reactor filled with 100 mL of ultrapure water, conducting sampling under simulated irradiation of visible light every one hour, and conducting diagraph analysis of data by using a chromatographic instrument to observe a change in a hydrogen production quantity of the product, where the hydrogen production quantity reaches 172 μmol/g after light irradiation for 3 hour.

Embodiment 3

A preparation method of a photocatalytic composite material includes the following steps:

(1) subjecting Sinaraundinaria, *nitida* leaves to soaking pretreatment to obtain template biomass;

(2) mixing 10 g of the template biomass with a 250 mL molybdenum source-sulfur source aqueous solution containing 0.15 mol/L of sodium molybdate and 0.30 mol/L of sodium sulfide, conducting impregnation at 26° C. for 72 hours, taking out an impregnation product, and conducting cleaning and drying successively to obtain a composite material precursor; and (3) heating to 650° C. in an atmosphere of nitrogen gas at a heating rate of 3° C./min, calcining for 120 min, and naturally cooling to room temperature to obtain the photocatalytic composite material.

A soaking pretreatment method of the Sinaraundinaria *nitida* leaves is the same as a soaking pretreatment method of the *Phyllostachys sulphurea* leaves in Embodiment 1.

An application of the photocatalytic composite material prepared in this embodiment in water decomposition for hydrogen production includes the following step:

adding 0.1 g of the product to a reactor filled with 100 mL of ultrapure water, conducting sampling under simulated irradiation of visible light every one hour, and conducting diagraph analysis of data by using a chromatographic instrument to observe a change in a hydrogen production quantity of the product, where the hydrogen production quantity reaches 166 μmol/g after light irradiation for 3 hour.

In the present invention, through impregnation and calcining, the template biomass loaded with sulfur ions and molybdenum ions is calcined, acicular molybdenum sulfide is formed by using a carbon skeleton of an organic matter and a special microscopic structure that are of the template biomass, and the molybdenum sulfide is formed and grows on a carbon surface, so that it is ensured that an acicular molybdenum sulfide and biomass carbon photocatalytic composite material is formed. The photocatalytic composite material provided in the present invention has an acicular structure, and therefore can improve a capability of separating a photogenerated electron hole pair, and avoid a photocorrosion effect existing in a transition metal sulfide semiconductor material, thereby greatly improving visible light utilization of the material, and showing a wide potential application value in water decomposition for hydrogen production under an action of visible light.

It can be learned from the embodiments that performance of photocatalytic hydrogen production of the photocatalytic composite material provided in the present invention is better than that of the pure molybdenum sulfide material and has excellent photocorrosion resistance, and hydrogen production efficiency is reduced by only approximately 10% after three cycles.

The foregoing descriptions are only preferred implementation manners of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. A preparation method of a photocatalytic composite material, comprising the following steps:
   (1) subjecting plant leaves to soaking pretreatment to obtain template biomass;
   (2) impregnating, in a molybdenum source-sulfur source aqueous solution, the template biomass obtained in step (1) to obtain a composite material precursor; and
   (3) calcining the composite material precursor prepared in step (2) to obtain the photocatalytic composite material;
   wherein a concentration of a molybdenum source in the molybdenum source-sulfur source aqueous solution is 0.05 mol/L to 1 mol/L.

2. The preparation method according to claim 1, wherein the plant leaves comprise Sinaraundinaria *nitida* leaves, salix leaves, *Indocalamus* leaves, *Phyllostachys sulphurea* leaves, or *Phyllostachys nigra* leaves.

3. A photocatalytic composite material obtained by using the preparation method according to claim 2, wherein the photocatalytic composite material comprises acicular molybdenum sulfide and biomass carbon, the acicular molybdenum sulfide is loaded to a surface of a flake carbon, the mass content of the biomass carbon is 70% to 90%, and the mass content of the molybdenum sulfide is 10% to 30%.

4. An application of the photocatalytic composite material according to claim 3 in water decomposition for hydrogen production.

5. The preparation method according to claim 1, wherein a concentration of a sulfur source in the molybdenum source-sulfur source aqueous solution is 0.05 mol/L to 1 mol/L.

6. A photocatalytic composite material obtained by using the preparation method according to claim 5, wherein the photocatalytic composite material comprises acicular molybdenum sulfide and biomass carbon, the acicular molybdenum sulfide is loaded to a surface of a flake carbon, the mass content of the biomass carbon is 70% to 90%, and the mass content of the molybdenum sulfide is 10% to 30%.

7. The preparation method according to claim 1, wherein a ratio of a volume of the molybdenum source-sulfur source aqueous solution to a mass of the template biomass is (1-3) L: 100 g.

8. A photocatalytic composite material obtained by using the preparation method according to claim 7, wherein the photocatalytic composite material comprises acicular molybdenum sulfide and biomass carbon, the acicular molybdenum sulfide is loaded to a surface of a flake carbon, the mass content of the biomass carbon is 70% to 90%, and the mass content of the molybdenum sulfide is 10% to 30%.

9. The preparation method according to claim 1, wherein the calcination time is 120 min to 158 min.

10. A photocatalytic composite material obtained by using the preparation method according to claim 9, wherein the photocatalytic composite material comprises acicular molybdenum sulfide and biomass carbon, the acicular molybdenum sulfide is loaded to a surface of a flake carbon, the mass content of the biomass carbon is 70% to 90%, and the mass content of the molybdenum sulfide is 10% to 30%.

11. A photocatalytic composite material obtained by using the preparation method according to claim 1, wherein the photocatalytic composite material comprises acicular molybdenum sulfide and biomass carbon, the acicular molybdenum sulfide is loaded to a surface of a flake carbon, the mass content of the biomass carbon is 70% to 90%, and the mass content of the molybdenum sulfide is 10% to 30%.

12. An application of the photocatalytic composite material according to claim 11 in water decomposition for hydrogen production.

13. A preparation method of a photocatalytic composite material, comprising the following steps:
  (1) subjecting plant leaves to soaking pretreatment to obtain template biomass;
  (2) impregnating, in a molybdenum source-sulfur source aqueous solution, the template biomass obtained in step (1) to obtain a composite material precursor; and
  (3) calcining the composite material precursor prepared in step (2) to obtain the photocatalytic composite material, wherein an impregnation time is 48 h to 72 h.

14. A photocatalytic composite material obtained by using the preparation method according to claim 13, wherein the photocatalytic composite material comprises acicular molybdenum sulfide and biomass carbon, the acicular molybdenum sulfide is loaded to a surface of a flake carbon, the mass content of the biomass carbon is 70% to 90%, and the mass content of the molybdenum sulfide is 10% to 30%.

15. A preparation method of a photocatalytic composite material, comprising the following steps:
  (1) subjecting plant leaves to soaking pretreatment to obtain template biomass;
  (2) impregnating, in a molybdenum source-sulfur source aqueous solution, the template biomass obtained in step (1) to obtain a composite material precursor; and
  (3) calcining the composite material precursor prepared in step (2) to obtain the photocatalytic composite material, wherein calcination temperature is 450° C. to 700° C.

16. The preparation method according to claim 15, wherein the calcination time is 120 min to 158 min.

17. A photocatalytic composite material obtained by using the preparation method according to claim 16, wherein the photocatalytic composite material comprises acicular molybdenum sulfide and biomass carbon, the acicular molybdenum sulfide is loaded to a surface of a flake carbon, the mass content of the biomass carbon is 70% to 90%, and the mass content of the molybdenum sulfide is 10% to 30%.

18. A photocatalytic composite material obtained by using the preparation method according to claim 15, wherein the photocatalytic composite material comprises acicular molybdenum sulfide and biomass carbon, the acicular molybdenum sulfide is loaded to a surface of a flake carbon, the mass content of the biomass carbon is 70% to 90%, and the mass content of the molybdenum sulfide is 10% to 30%.

* * * * *